(12) United States Patent
Pan

(10) Patent No.: US 6,195,479 B1
(45) Date of Patent: Feb. 27, 2001

(54) FIBEROPTIC REFLECTIVE VARIABLE ATTENUATOR AND ON-OFF SWITCH

(75) Inventor: Jing-Jong Pan, Milpitas, CA (US)

(73) Assignee: E-Tek Dynamics, Inc., San Jose, CA (US)

( * ) Notice: Subject to any disclaimer, the term of this patent is extended or adjusted under 35 U.S.C. 154(b) by 0 days.

(21) Appl. No.: 09/340,863

(22) Filed: Jun. 28, 1999

(51) Int. Cl.$^7$ ........................................... G02B 6/26
(52) U.S. Cl. ............................ 385/18; 385/15; 359/281; 359/495
(58) Field of Search ..................... 385/18, 11, 15–16, 385/74; 359/494–495, 281; 372/703

(56) References Cited

U.S. PATENT DOCUMENTS

| | | | |
|---|---|---|---|
| 5,276,747 | 1/1994 | Pan | 385/34 |
| 5,499,132 | * 3/1996 | Tojo et al. | 359/281 |
| 5,546,219 | * 8/1996 | Iida | 359/281 |
| 5,557,692 | * 9/1996 | Pan et al. | 385/11 |
| 5,689,359 | * 11/1997 | Kurata et al. | 359/281 |
| 6,055,104 | * 4/2000 | Cheng | 359/495 |

* cited by examiner

Primary Examiner—Rodney Bovernick
Assistant Examiner—Ellen Kim
(74) Attorney, Agent, or Firm—Townsend and Townsend and Crew LLP

(57) ABSTRACT

A polarization-insensitive fiberoptic reflective variable attenuator and on-off switch is provided. The device has a sleeve holding a pair of optical fibers, a first, second and third birefringent crystals, a collimating GRIN lens, a liquid crystal cell and a mirror element. The first birefringent crystal is fixed over an end facet of one of the optical fiber pair, and the second and third birefringent crystals are fixed over an end facet of the other of the optical fiber pair. The GRIN lens has a first end face proximate the first, second and third birefringent crystals and the liquid crystal cell is located between the mirror element and a second end face of the GRIN lens. Responsive to preselected voltages applied to its electrical terminals, the liquid crystal cell is in a first state or a second state. The end facets of the pair of optical fibers, the first, second and third birefringent crystals, the GRIN lens, the liquid crystal cell, and the mirror element are arranged and oriented with respect to each other so that light from one optical fiber passes through, and back from, the first, second and third birefringent crystals, the GRIN lens, the liquid crystal cell and the mirror element into the other optical fiber when the liquid crystal cell is in the On state, and light from one optical fiber passes through, and back from, the first, second and third birefringent crystals, the GRIN lens, the liquid crystal cell and the mirror element , but not into the other second optical fiber when the liquid crystal cell is in the Off state. Light signal traveling between the first and second optical fibers can be attenuated by voltages intermediate the voltage corresponding to the On and Off states.

21 Claims, 6 Drawing Sheets

Birefringent Crystal I Orientation
(Optical axis plane is in vertical and α=45°)

Birefringent Crystal II Orientation
(Optical axis plane is 45° to the horizontal and α=45°)

Birefringent Crystal III Orientation
(Optical axis plane is 45° to the horizontal and α=45°)

FIBEROPTIC REFLECTIVE VARIABLE ATTENUATOR AND ON-OFF SWITCH

BACKGROUND OF THE INVENTION

The present invention is related to optical fiber networks, and, in particular, to switches for directing optical signals along fibers of an optical network, or to attenuators for controlling the strength of optical signals in an optical fiber.

In optical fiber networks, switches are often used to direct optical signals along one optical fiber or another. Many, if not most, of these switches are electromechanical devices which have parts moving in response to electrical signals. While miniaturization has desirably reduced the switching speeds of such devices, switch parts are still being accelerated and decelerated with the consequent wear and breakdown. Furthermore, the physical movement of parts places an effective limitation on further improvement on switching speeds. Hence it is desirable that fiberoptic devices, including switches, be purely optical, or electro-optical, devices. Such devices ideally do not have moving parts.

The present invention provides for a switch which is electro-optical. By applying preselected electrical voltages to the switch corresponding to an On state and an Off state, the switch transmits optical signals between two optical fibers or blocks the signals. Furthermore, by applying electrical voltages intermediate the preselected voltages, the switch operates as an electro-optical attenuator. Attenuators are often used in fiberoptic networks to balance the strength of optical signals along different paths. By controlling the voltage to the device of the present invention, the strength of the signals between two optical fibers is modulated.

SUMMARY OF THE INVENTION

The present invention provides for a fiberoptic reflective variable attenuator and on-off switch comprising a sleeve having a longitudinal channel, a pair of optical fibers fixed in the longitudinal channel, a first, second and third birefringent crystals, a collimating GRIN lens, a liquid crystal cell and a mirror element. The first birefringent crystal is fixed over an end facet of one of the optical fiber pair, and the second and third birefringent crystals are fixed over an end facet of the other of the optical fiber pair. The GRIN lens has a first end face proximate the first, second and third birefringent crystals and the liquid crystal cell is located between the mirror element and a second end face of the GRIN lens. Responsive to preselected voltages applied to its electrical terminals, the liquid crystal cell is in a first state or a second state. The end facets of the pair of optical fibers, the first, second and third birefringent crystals, the GRIN lens, the liquid crystal cell, and the mirror element are arranged and oriented with respect to each other so that light from one optical fiber passes through, and back from, the first, second and third birefringent crystals, the GRIN lens, the liquid crystal cell and the mirror element into the other optical fiber when the liquid crystal cell is in the first state, and light from one optical fiber passes through, and back from, the first, second and third birefringent crystals, the GRIN lens, the liquid crystal cell and the mirror element, but not into the other second optical fiber when the liquid crystal cell is in the second state.

The present invention also provides for multiple fiberoptic reflective variable attenuator and on-off switch devices. Additional pairs of optical fibers may be inserted into the sleeve channel. The end facets of the additional pairs of optical fibers, the first, second and third birefringent crystals, the GRIN lens, the liquid crystal cell, and the mirror element arranged and oriented with respect to each other so that light from a first optical fiber of one of the additional pairs passes through, and back from, the first, second and third birefringent crystals, the GRIN lens, the liquid crystal cell and the mirror element into a second optical fiber of the one pair when the liquid crystal cell is in the first state, but light from the first optical fiber of the one pair passes through, and back from, the first, second and third birefringent crystals, the GRIN lens, the liquid crystal cell and the mirror element, but not into the second optical fiber of the pair when the liquid crystal cell is in the second state.

The first and second states of the liquid crystal cell represent the extreme On and Off states so that the operation of the described device is that of a switch. If voltages intermediate to those corresponding to the On and Off states are applied to the liquid crystal cell, the amount of light passing between the first and second optical fiber cores are proportionally controlled. The device operates as an attenuator.

DESCRIPTION OF THE SPECIFIC EMBODIMENTS

Figure 1:
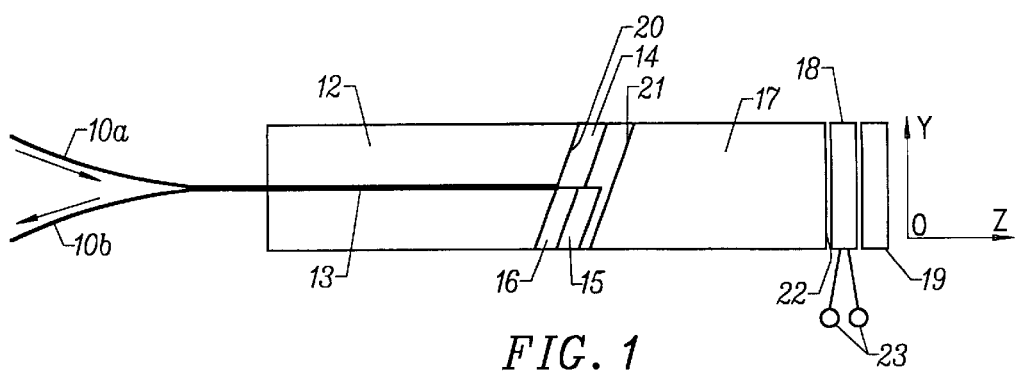
FIG. 1 is a representational cross-sectional side view of a fiberoptic reflective variable attenuator and on-off switch device, according to one embodiment of the present invention.

FIG. 1 illustrates the arrangement of the elements of a fiberoptic reflective variable attenuator and on-off switch device, according to one embodiment of the present invention. The device has a pair of optical fibers 10a and 10b. Typically, these optical fibers are single mode optical fibers. The ends of the fibers are held in a central longitudinal channel 13 of a glass ferrule 12. The end facets of the two fibers 10a and 10b are co-planar with an end face 20 of the ferrule 12. The end face 20 (and the end facets of the fibers 10a and 10b) is slightly slanted with respect to the longitudinal axis of the ferrule 12. A first birefringent crystal 14 is fixed over the end facet of the fiber 10a. A second birefringent crystal 15 and third birefringent crystal 16 are fixed in a stack over the end facet of the other fiber 10b. More details of this arrangement are described below.

Facing the birefringent crystals 14–16 and the end face 20 of the ferrule 12 is a reciprocally slanted end face 21 of a quarter-pitch GRIN (Graded INdex) lens 17. At an opposite end face 22 of the GRIN lens 17 is placed a liquid crystal cell 18. Following the liquid crystal cell 18 is a mirror element 19, which is highly reflective. The element 19 may be a dielectric multilayer mirror, or a metallic mirror, formed on a separate element, such as a plate, or may be simply formed by coating the far surface of the cell 18 with multiple dielectric layers, or metallic layers.

The device operates generally as follows: Light entering from the fiber 10a is separated into two linearly polarized component beams by the first birefringent crystal 14. When the liquid crystal cell 18 is On, there is a rotation imparted to the polarized components after the light passes through the GRIN lens 17 and the liquid crystal cell 18 twice by reflection off the mirror element 19. The second and third birefringent crystals 15 and 16 then combine the polarized component beams into one beam at the end facet of the fiber 10b. When the liquid crystal cell 18 is Off, there is no rotation imparted to the polarized components after the light passes through the GRIN lens 17 and the liquid crystal cell 18 twice by reflection off the mirror element 19. The unchanged polarization ensures that the second and third birefringent crystals 15 and 16 do not combine the two polarized component beams into one, and the beams do not arrive at the end facet of the fiber 10b. Light from one fiber 10a cannot enter the other fiber 10b. Light is effectively blocked.

Figure 2A:
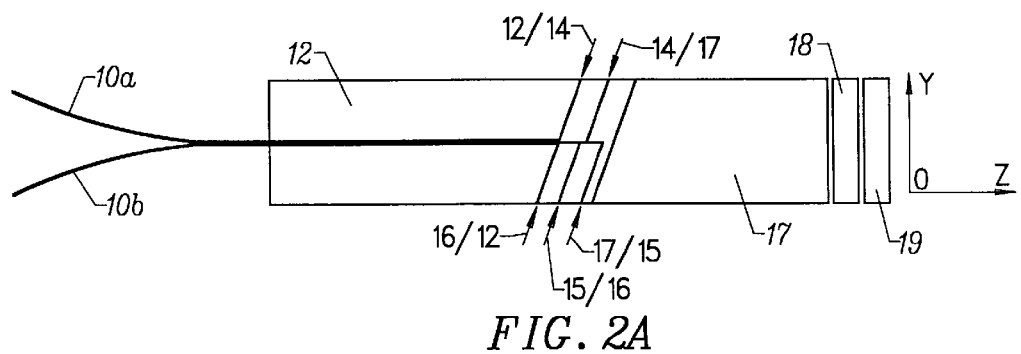
FIG. 2A is a cross-sectional side view of the FIG. 1 device with locations between elements indicated.
Figure 2B:
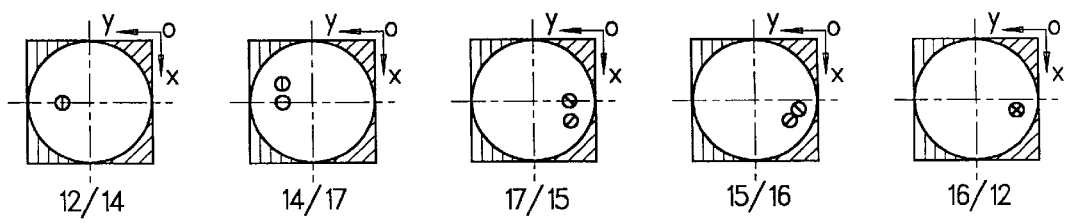
FIG. 2B is a representation of the state of the light traveling through the FIG. 1 device at the locations indicated in FIG. 2A when the liquid crystal cell is in an On state.
Figure 2C:
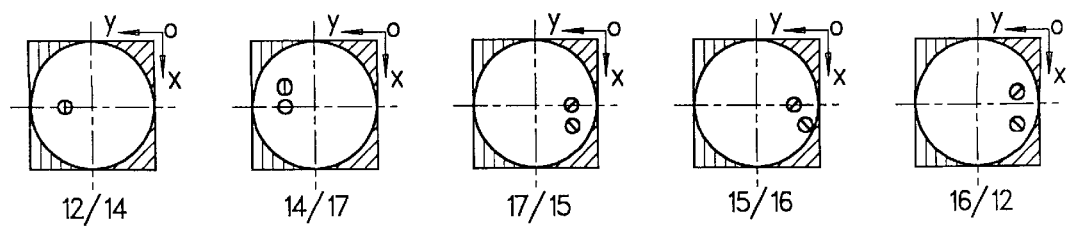
FIG. 2C is a representation of the state of the light traveling through the FIG. 1 device at the locations indicated in FIG. 2A when the liquid crystal cell is in an Off state.

FIGS. 2A, 2B and 2C detail the operation of device of FIG. 1 and its various elements. In the cross-sectional side view of FIG. 2A, a location between elements is indicated by the notation, i/j, i.e., the location between the element having reference numeral i and the element having reference numeral j. The direction of the light is also indicated by the order of the reference numerals. Hence, the notation, i/j, also indicates the direction of the light at the location between elements i and j and from the element i toward element j. FIG. 2B represents the state of the light traveling from the optical fiber 10a to the optical fiber 10b through the device at the locations indicated in FIG. 2A when the liquid crystal cell 18 is turned On; FIG. 2C represents the state of the light traveling in the same direction when the liquid crystal cell 18 is turned Off. It should be noted the direction of the light was selected arbitrarily since the direction of the light is reversible.

Figure 4:
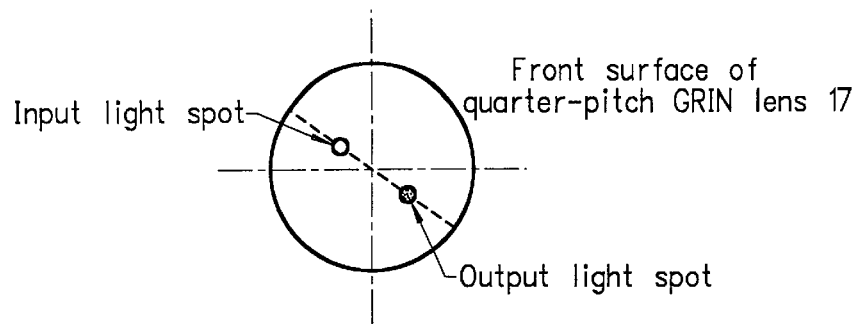
FIG. 4 is an end view of the GRIN lens of the FIG. 1 fiberoptic reflective variable attenuator and on-off switch device.

In FIG. 2B, the light at the end facet of the fiber 10a is shown at the location 12/14. Note that the input light is displaced from the longitudinal axis of the GRIN lens 17. The first birefringent crystal 14 separates the light into its two linear polarization components, the o-ray and the e-ray. Location 14/17 illustrates this separation according to the state of polarization of the light. The light then is collimated by the GRIN lens 17 and the polarization of each component is rotated 22.5° by the liquid crystal cell 18. The light is then sent back through the liquid crystal cell 18 again by the mirror element 19. The liquid crystal cell 18 again rotates the polarization of each beam by 22.5° so that the total rotation of the polarization in each component is 45° in a positive, counter-clockwise direction. Due to the action of the GRIN lens 17, the two polarized component beams exchange their relative positions vertically and horizontally. Their positions are symmetrical to their original positions around the GRIN lens optical axis. FIG. 4 illustrates this action by the GRIN lens 17 and the mirror element 19. The light is now ready to enter the second birefringent crystal 15, represented by the location 17/15. The second birefringent crystal 15 moves the location of one of the polarization component beams, as shown at the location 15/16, and the third birefringent crystal 16 moves the other so that both polarized component beams are combined into one, illustrated by the location 16/12. The combined beam is aligned with the end facet of the fiber 10b so that the light path through the device is complete. Light enters the fiber 10 out and leaves through the fiber 10b. Likewise, light entering through the fiber 10b leaves through the fiber 10a.

Such is not the case when the liquid crystal cell 18 is in the Off state, as illustrated by FIG. 2C. As in the case above, light from the fiber 10a is separated by the first birefringent crystal 14 into the two linear polarization components, the o-ray and the e-ray. Location 14/17 illustrates this separation according to the state of polarization of the light. The light then is collimated by the GRIN lens 17 and passed to the liquid crystal cell 18. In this case, however, the cell is in the Off state and the polarization of each component remains unrotated after passing through the liquid crystal cell 18. The light is then sent back through the liquid crystal cell 18 again by the mirror element 19. The liquid crystal cell 18 again leaves the polarization of each beam unchanged. The light before entry into the second birefringent crystal 15 is represented by the location 17/15. The second birefringent crystal 15 moves the location of one of the polarization component beams, as shown at the location 15/16, and the third birefringent crystal 16 moves the other, but the polarized component beams remain separate, illustrated by the location 16/12 and unaligned with the end facet of the fiber 10b so that the light path through the device is incomplete. Likewise, light in the reverse direction, i.e., light entering the fiber 10b does not enter the fiber 10a. The device in the Off state effectively blocks light between the two fibers 10a and 10b.

The birefringent crystals 14–16, all rectangular solids, must be arranged and oriented to effect the operation described above. If all three crystals are formed from the same birefringent crystal material, the thickness of the second birefringent crystal 15 should be equal to the thickness of the third birefringent crystal 16 and is √2/2 times the thickness of the first birefringent crystal 14. The principal plane of the second birefringent crystal 15 is perpendicular to the principal plane of the third birefringent crystal 16 and forms a 45 angle with the principal plane of the first birefringent crystal 14. The birefringent crystals 14–16 can be formed from any number of birefringent crystals, such as calcite, rutile, $YVO_4$, lithium niobate and so on. Some properties of these materials are shown in the table below:

Table of Birefringent Crystals

| Material | $n_e$ | $n_o$ | Maximum Separation Angle |
|---|---|---|---|
| Calcite | 1.4777 | 1.6343 | 5.733° |
| Rutile | 2.709 | 2.453 | 5.651° |
| $YVO_4$ | 2.1486 | 1.9447 | 5.675° |
| Lithium Niobate | 2.208 | 2.300 | 2.336° |

Figure 3A:
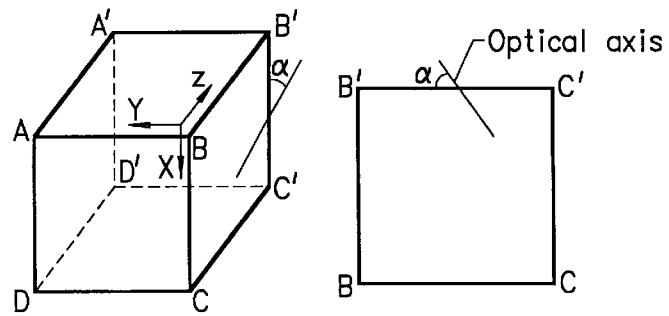
FIG. 3A illustrates the orientation of the first birefringent crystal in the FIG. 1 device.
Figure 3B:
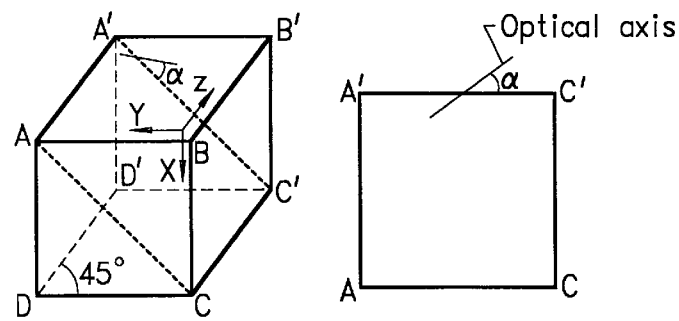
FIG. 3B illustrates the orientation of the second birefringent crystal in the FIG. 1 device.
Figure 3C:
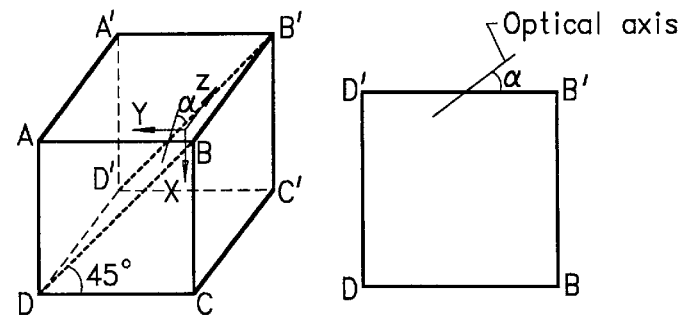
FIG. 3C illustrates the orientation of the third birefringent crystal in the FIG. 1 device.

For one embodiment of the present invention, FIGS. 3A, 3B and 3C illustrate the arrangement of the three birefringent crystals 14–16 if all are formed from $YVO_4$. As shown in FIG. 3A, the first birefringent crystal 14 has its optical axis plane in the vertical (the XOZ) plane and its optical axis oriented at α=45°, Dimensionally, ABCD=A'B'C'D'=1 mm×1 mm, and AA'=BB'=CC'=DD'=0.300 mm. The second birefringent crystal 15 has its optical axis plane arranged 45° to the horizontal and its optical axis oriented α=45°, Its dimensions are =ABCD=A'B'C'D'1 mm×1 mm and AA'=BB'=CC'=DD'=0.212 mm. Finally, the third birefringent crystal 16 has its optical axis plane set at 45° to the horizontal and its optical axis oriented at α=45°, ABCD=ABCD=1 mm×1 mm, and AA'=BB'=CC'=DD'=0.212 min. In fact, the third birefringent crystal 16 is the same as the second birefringent crystal 15, except that the rotational orientations of the two crystals are different.

In the design of this device, a consideration in the selection of the birefringent materials is the separation between the end facets of the fibers 10a and 10b in the channel 13. If the separation between the optical fibers and end facets is large, then birefringent crystals having a smaller separation angle, such as lithium niobate (see the table above) may be used. The light beams must be adequately separated after passing through a birefringent crystal to ensure high extinction ratio performance for the On-Off switch. For materials having a lesser separation ability, a thicker crystal must be used. The thicker crystal results in a larger beam diameter and the two end facets must be accordingly separated so that the edge of the first birefringent crystal 14 is sufficiently removed from the center of end facet of the input fiber to encompass the larger beam; likewise, the second and third birefringent crystals 15 and 16 must have sufficient room to adequately cover the end facet of the output fiber.

Electrical voltage signals on the control terminals 23 create the electric fields to align the liquid crystals in the cell 18 in one direction or the other to create the On and Off states. A description of a liquid crystal cell which might be used in the present invention is found in U.S. Pat. No. 5,727,109, entitled "OPTICAL ATTENUATOR WITH LOW POLARIZATION MODE DISPERSION," which issued Mar. 10, 1998 to J. J. Pan et al. and which is assigned to the present assignee. It should be noted that the On and Off states represent two opposite states for the liquid crystal cell 18. Either a voltage ($V_{ON}$) is applied to the cell 18 such that the liquid crystals in the cell 18 are aligned in one direction (to rotate each light component 22.5 ), i.e., the On state, or another voltage ($V_{OFF}$) is applied so that the liquid crystals change the polarization of the light 45 to that of the On state, i.e., the Off state. However, if an intermediate voltage is applied so that the liquid crystals rotate the polarization direction any other amount, some light will pass from one optical fiber to the other. Hence, as the voltage corresponding to the On state, is lowered, the light through the described device is increasingly attenuated until the voltage corresponding to the Off state is reached. Hence the described device can operate as a switch by toggling the voltage to the liquid crystal cell between the On and Off states. The described device can also be operated as an attenuator by using voltages intermediate the voltages corresponding to the On and Off states.

Due to the distance between the end facets of the optical fibers 10a and 10b and the GRIN lens 17, the GRIN lens 17 is actually somewhat shorter than a quarter pitch. The GRIN lens 17 is in the range of 0.25 to 0.20 pitch long to ensure that the light is collimated after it passes through the GRIN lens 17 the first time. The GRIN lens 17 and the mirror element 19 are arranged so that the normal of the mirror element is parallel to the optical axis of the GRIN lens 17. The GRIN lens has a symmetrical mapping characteristic around its optical axis as shown in FIG. 4. Even with the liquid crystal cell 18 inserted between the GRIN lens 17 and the mirror element 19, the mapping remains unchanged, though the polarization states of the light are transformed by the liquid crystal cell 18.

Figure 5A:
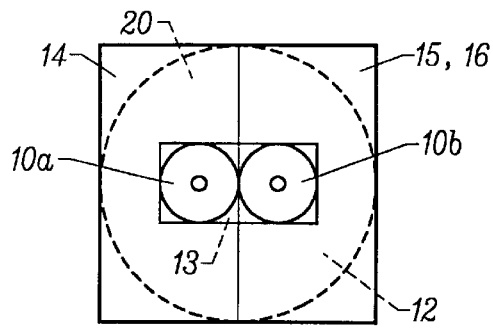
FIG. 5A is a cross-sectional end view illustrating the arrangement of the end facets of the input and output fibers with the first, second and third birefringent crystals of the FIG. 1 device.
Figure 5B:
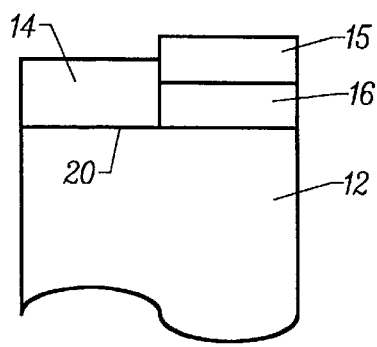
FIG. 5B is a side view of the arrangement of FIG. 5A.

FIG. 5A is an end cross-sectional view of the birefringent crystals 14–16 over the end facets of the two optical fibers 10a and 10b, which are fixed in the center longitudinal channel 13 of the ferrule 12. The first birefringent crystal 14 covers the end facet of one fiber 10a and the second and third birefringent crystals 15, 16 cover the end facet of the other fiber 10b. The relationship of the two birefringent crystals 15, 16 is better shown in the side view of FIG. 5B, which shows the end face 20 of the ferrule 12 without a slant. The birefringent crystals 14–16 are epoxied over the end face 20 of the ferrule 12. An optically transparent epoxy, such as Norland 62 from Norland Products, Inc. of New Brunswick, N.J., or or 353 ND from Epoxy Technology Inc, of Billerica, Mass., has been found suitable for this purpose. Other epoxies might also used. The end face 20 of the ferrule 12 is angle-polished in a plane having a line connecting the centers of the two end facets of the fibers 10a and 10b. The angle is about 8–12° from the plane perpendicular to the longitudinal axis of the ferrule 12. Thus it should be understood that the slant of the end face 20 in FIG. 1 (and FIG. 2A) is 90° off with respect to the placement of the birefringent crystals 14–16.

Figure 6A:
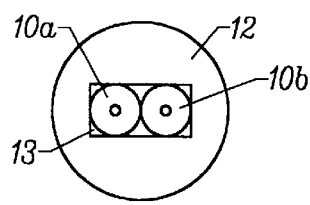
FIGS. 6A–6D illustrate different configurations of the ferrule holding the input and output optical fibers of the FIG. 1 device.
Figure 6B:
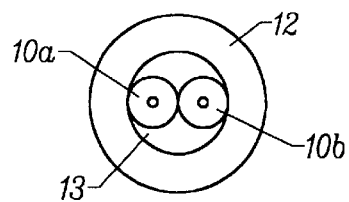
Figure 6C:
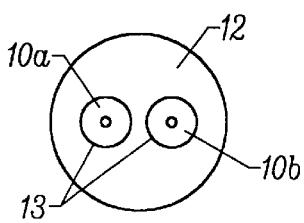
Figure 6D:
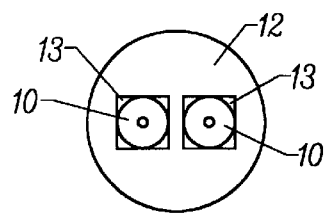

The central channel 13 of the ferrule 12 can be shaped in a number of different ways to hold the fibers 10a and 10b. Besides the rectangular cross-section of FIG. 6A, the channel 13 may have a circular cross-section to hold the fibers 10a and 10b, as illustrated in FIG. 6B. In FIG. 6C the channel 13 is separated into two parts, with each part having a circular cross-section and dimensioned to snugly hold one of the fibers 10a and 10b. In FIG. 6D, the separated channels 13 are square in cross-section.

Figure 7:
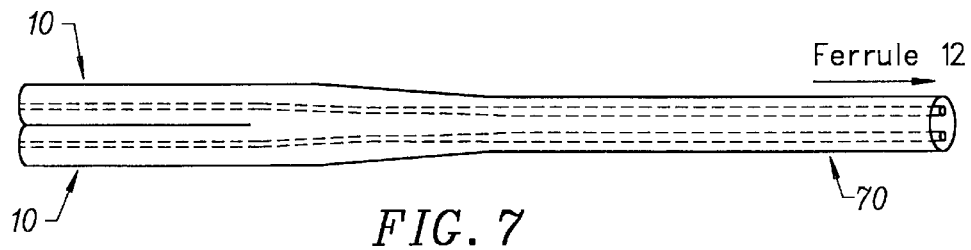
FIG. 7 illustrates a joined optical fiber subassembly which may used in the FIG. 1 device.

Rather than two completely separated optical fibers, an optical fiber end section having the two optical fibers 10a and 10b joining into a single cladding which encloses two cores 70 may be inserted into the channel 13 of the ferrule. FIG. 7 is an enlarged illustration of this end section which separates into the two optical fibers 10a and 10b, each with its own core and cladding, away from the ferrule 12. Besides the ease in manufacturing in securing only one optical fiber, i.e., a single cladding with two cores 70, into the ferrule channel 13, performance is enhanced. Rather than the relatively small diameter of a single mode optical fiber, e.g., 8.3 $\mu$m for an SMF-28 fiber, the cores in the channel 13 have expanded diameters. Note the expanded diameters of the cores in the section 70 in comparison with the cores of the optical fibers 10a and 10b. The larger diameters increase alignment tolerances. More details of this end section having two cores are described in U.S. application Ser. No. 09/342,456 entitled "FIBEROPTIC DEVICES WITH A JOINED OPTICAL FIBER SUBASSEMBLY" (Attorney Docket No. 013011 - 008000), filed of even date by J. J. Pan et al., and U.S. application Ser. No. 09/275,354, entitled "THERMALLY EXPANDED MULTIPLE CORE FIBER," and filed Mar. 23, 1999 by Yong Huang. Both applications are assigned to the present assignee, which applications are hereby incorporated by reference for all purposes.

Figure 8:
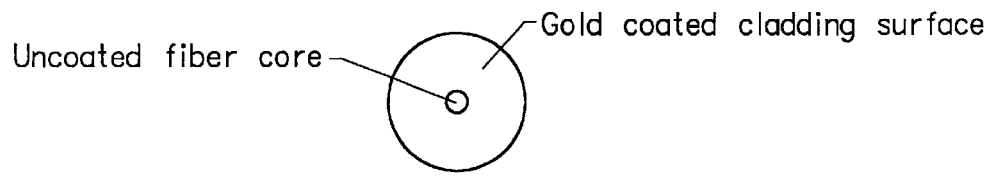
FIG. 8 illustrates the end facet of the one of the optical fibers of the FIG. 1 device.

To further improve the performance of the optical device, the end facet of the input optical fiber 10a should have its core clear, but the cladding coated with an optically opaque coating, such as gold. Such an end facet is illustrated by FIG. 8. The opaque coating over the cladding blocks light in the reverse direction which is incident upon the cladding of the input fiber from undesirably leaking into the core. A description of this fiber end facet and its manufacturing process may be found in U.S. Pat. No. 5,546,186, entitled "OPTICAL FIBER END FOR APPLICATION IN AN OPTICAL ISOLATOR AND A METHOD OF MANUFACTURE THEREOF," which issued on Aug. 13, 1996 to M. Shih et al and is assigned to the present assignee, and which is hereby incorporated for all purposes.

Besides its miniature size, the device of the present invention has relatively low manufacturing costs with ease of assembly. Both the optical fibers are fixed in the same ferrule. Optical performance is high. The device has a wide spectral bandwidth, very low polarization mode dispersion (PMD) and polarization dependent loss (PDL), and is polarization insensitive.

Figure 9:
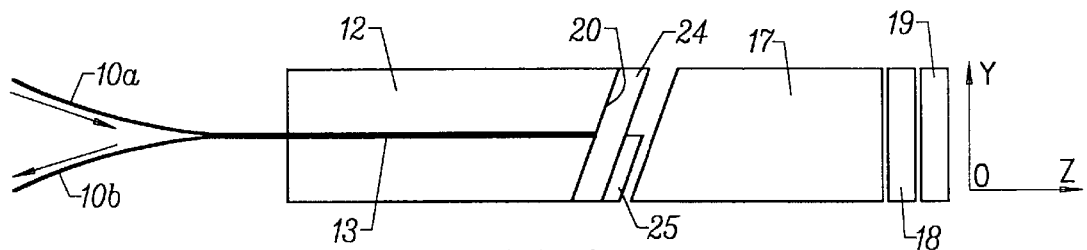
FIG. 9 is a representational cross-sectional side view of a fiberoptic reflective variable attenuator and on-off switch device with a half-wave plate, according to another embodiment of the present invention.

An alternative embodiment of the present invention uses a half-wave plate to replace the second and third birefringent crystals in the optical device of FIG. 1. As shown in FIG. 9, the same reference numerals are used where the element has the same function or operation as the elements of FIG. 1. The device has the optical fiber 10a and 10b, which ends are held in the central longitudinal channel 13 in the glass ferrule 12 The end facets of the two fibers 10a and 10b are co-planar with the slanted end face 20 of the ferrule 12. Over the end facets of both fibers 10a and 10b is fixed a birefringent crystal 24 and a half-wave plate 25 is fixed on the birefringent crystal 24 over the end facet of the second fiber 10b. Facing the crystal 24, the half-wave plate 25, and the end face 20 of the ferrule 12 is the reciprocally slanted end face 21 of the quarter-pitch GRIN (Graded INdex) lens 17. At the opposite end face 22 of the GRIN lens 17 is placed the liquid crystal cell 18. Following the cell 18 is the mirror element 19.

The birefringent crystal 24 is a rectangular solid and for the materials listed in the table above has its principal plane in the vertical (the XOZ) plane. For the large separation materials, i.e., calcite, rutile and $YVO_4$, the thickness of the crystal 24 is approximately 300 $\mu$m. The half-wave 25 is a zero order element and its slow axis forms a 22.5° angle with the Y axis. An exemplary half-wave plate is quartz crystal with thickness of about 90 $\mu$m.

Figure 10A:
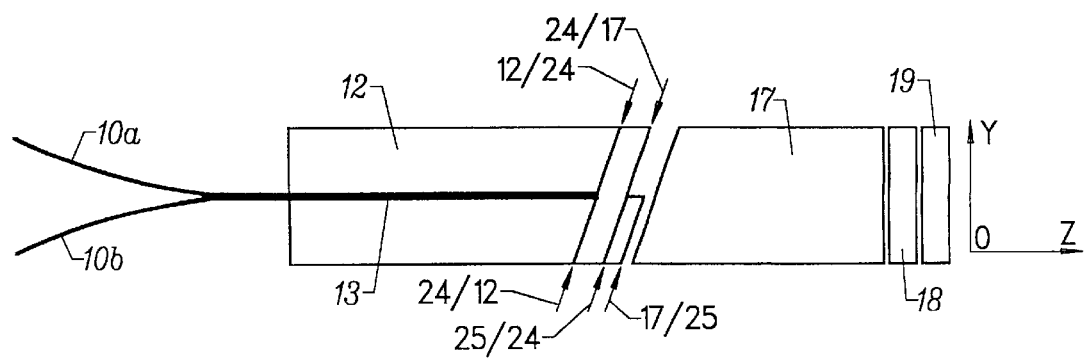
FIG. 10A is a cross-sectional side view of the FIG. 9 device with locations between elements indicated.
Figure 10B:
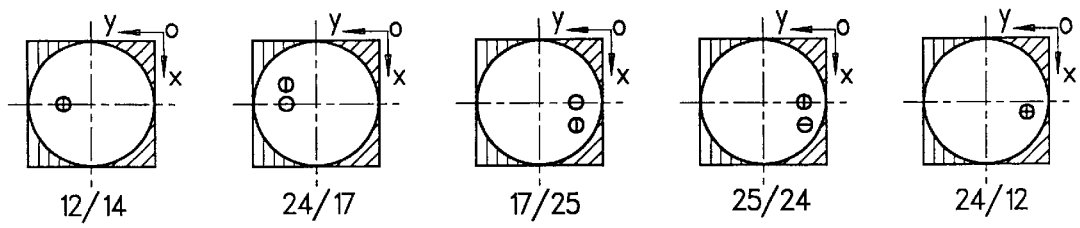
FIG. 10B is a representation of the state of the light traveling through the FIG. 9 device at the locations indicated in FIG. 10A when the liquid crystal cell is in an On state.
Figure 10C:
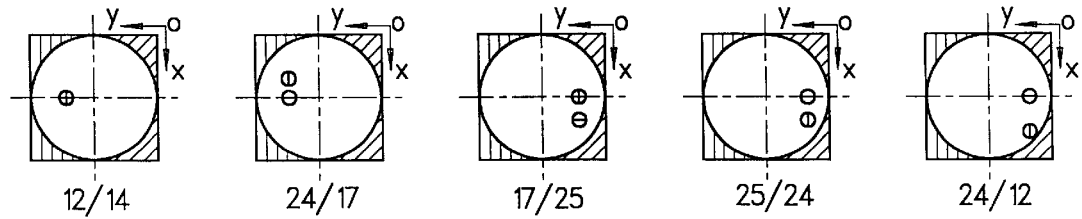
FIG. 10C is a representation of the state of the light traveling through the FIG. 9 device at the locations indicated in FIG. 10A when the liquid crystal cell is in an Off state.

FIGS. 10A, 10B and 10C illustrate the detailed operation of the FIG. 9 device and its various elements. In the side cross-sectional diagram of FIG. 10A, locations between elements are indicated by the notation, i/j, i.e., the location between the element having reference numeral i and the element having reference numeral j. FIG. 10B represents the state of the light traveling through the FIG. 9 device at the locations indicated in FIG. 10A when the liquid crystal cell is On; FIG. 10C is a representation of the state of the light traveling through the device at the locations indicated in FIG. 10A when the cell is Off.

Figure 11:
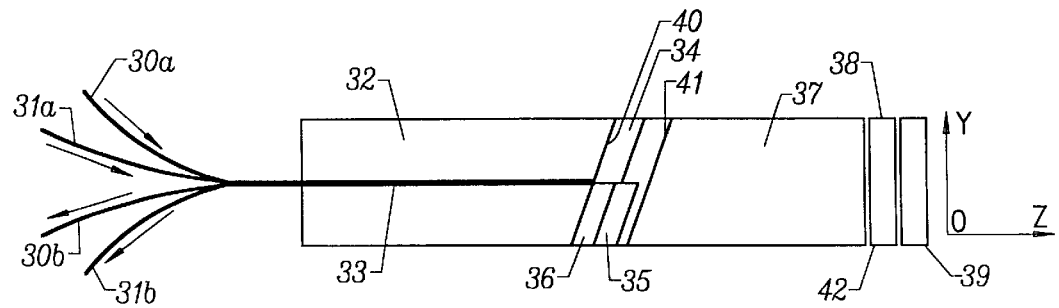
FIG. 11 is a representational cross-sectional side view of a double fiberoptic reflective variable attenuator and on-off switch device, according to another embodiment of the present invention.

The present invention also offers the advantage of a plurality of fiberoptic reflective variable attenuator and On-Off switch devices in a single assembly. FIG. 11 illustrates a double device, i.e., a fiberoptic reflective variable attenuator and On-Off switch which operates the connection between four optical fibers at once. The device has two pairs of optical fibers 30a and 30b, and 31a and 31b. The ends of these four optical fibers are held in a central longitudinal channel 33 in a glass ferrule 32 The end facets of the four fibers 30a, 30b, 31a and 31b are co-planar with a slanted end face 40 of the ferrule 32. Also attached to the end face 40 is a first birefringent crystal 34, a second birefringent crystal 35 and a third birefringent crystal 36. Facing the birefringent crystals 34–36 and end face 40 of the ferrule 32 is a reciprocally slanted end face 41 of a quarter-pitch GRIN lens 37. As shown below, the first birefringent crystal 34 is arranged over the end facets of the fibers 30a, 31a, and the second and third birefringent crystals 35 and 36 are arranged over the end facets of the output fibers 30b, 31b. Over an opposite end face 42 of the GRIN lens 17 is placed a liquid crystal cell 38. Following the cell 38 is a highly reflecting mirror element 19, which may be a dielectric multilayer mirror, or a metallic mirror, formed as a separate element or simply coated on the far side of the liquid crystal cell 38.

Figure 12:
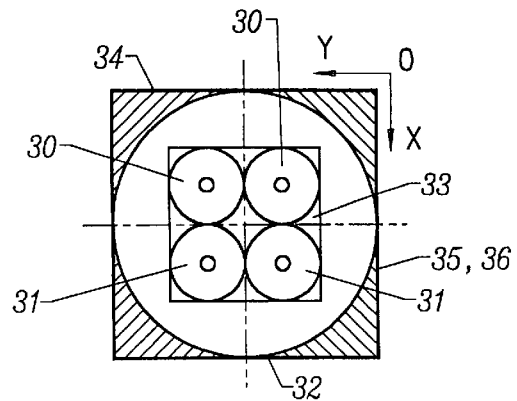
FIG. 12 is a cross-sectional end view illustrating the arrangement of the end facets of the two pairs of optical fibers with the first, second and third birefringent crystals of the FIG. 11 device.
Figure 13:
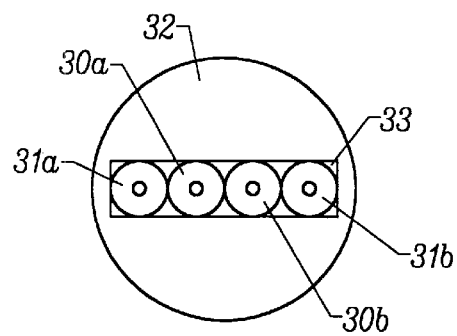
FIG. 13 illustrates another configuration of the ferrule holding the two pairs of optical fibers of the FIG. 11 device.

The end cross-sectional view of the ferrule 32 of FIG. 12 shows the arrangement the four optical fibers 30a, 31a, 30b, and 31b in the channel 33. The channel 33 has a square cross-section. The first birefringent crystal 34 covers the end facets of the fibers 30a, 31a, while the second and third birefringent crystals 35, 36 cover the end facets of the fibers 30b, 31b FIG. 13 is an end cross-section view of another arrangement of the two optical fibers 30a, 31a and the two fibers 30b, 31b. In this case the channel 33 has a rectangular cross-section so that the end facets of the four optical fibers 30a, 31a, 30b, and 31b are linearly aligned. In any case, it is understood that the relationship between the pairs of optical fibers remains, i.e., between the fibers 30a and 30b; and between the fibers 31a and 31b.

Figure 14:
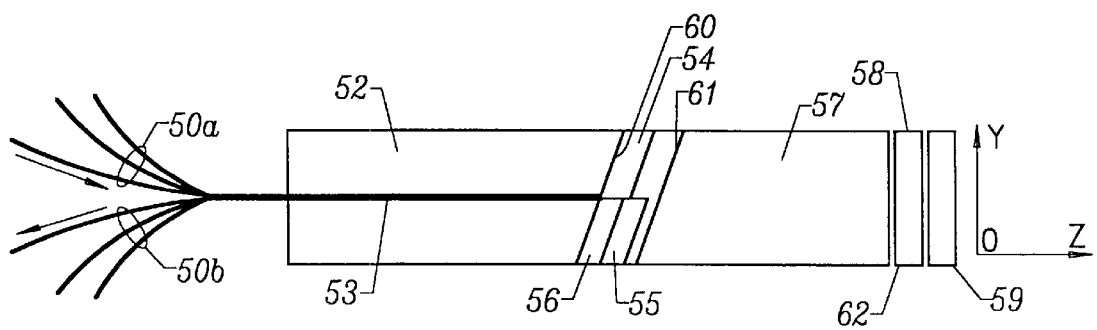
FIG. 14 is a representational cross sectional side view of a multiple fiberoptic reflective variable attenuator and on-off switch device, according to another embodiment of the present invention.

A further generalization of the device according to the present invention is shown in FIG. 14. In this optical device there are n pairs of optical fibers. Similar to the previously described devices of the present invention, the fiberoptic reflective variable attenuator and On-Off switch device has n pairs of optical fibers, each pair having fibers 50a and 50b. The ends of these 2 n optical fibers are held in a central longitudinal channel 53 in a glass ferrule 52 with the end facets of the 2n optical fibers 50a and 50b co-planar with a slanted end face 60 of the ferrule 52. Also attached to the end face 60 is a first birefringent crystal 54, a second birefringent crystal 55 and a third birefringent crystal 56. Facing the birefringent crystals 54–56 and the end face 60 of the ferrule 52 is a reciprocally slanted end face 61 of a quarter-pitch GRIN lens 57. As shown in FIG. 14, the first birefringent crystal 54 is arranged over the end facets of the input fibers 50*a* and the second and third crystals 55 and 56 are arranged over the end facets of the output fibers 50*b*. Over an opposite end face 62 of the GRIN lens 57 is placed a liquid crystal cell 58. Following the cell 58 is a highly reflecting mirror element 59.

Figure 15:
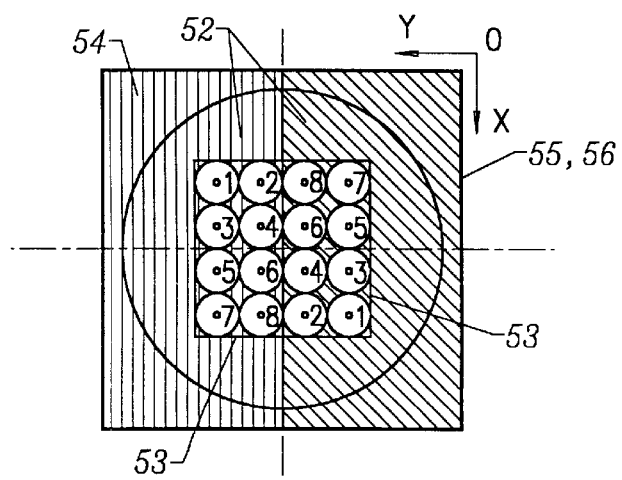
FIG. 15 illustrates the arrangement of the end facets of the multiple pairs of optical fibers with the first, second and third birefringent crystals of the FIG. 14 device.

FIG. 15 illustrates an arrangement for 8 pairs of optical fibers for the generalized multiple fiberoptic reflective variable attenuator and On-Off switch device of FIG. 14. The channel 53 has a square cross-section and the 8 fibers 50*a*; the 8 fibers 50*b* occupy the remaining half of the channel 53. As before, the first birefringent crystal 54 covers the end facets of the fibers 50*a* and the second and third birefringent crystals 55, 56 cover the fibers 50*b*. It should be noted that the input fibers are labeled from 1–8. Likewise the output fibers are labeled from 1–8 to indicate the correspondence between pairs of fibers. Hence there are eight devices with optical fiber pairs 1/1, 2/2. 3/3 and so forth.

While the description above provides a fall and complete disclosure of the preferred embodiments of the present invention, various modifications, alternate constructions, and equivalents will be obvious to those with skill in the art. Thus, the scope of the present invention is limited solely by the metes and bounds of the appended claims.

What is claimed is:

1. A fiberoptic reflective variable attenuator and on-off switch comprising
    a sleeve having a longitudinal channel;
    a first pair of optical fibers in said longitudinal channel, each of said first pair of optical fibers having an end facet;
    a first birefringent crystal over an end facet of one of said pair of said optical fibers;
    second and third birefringent crystals over an end facet of the other of said pair of said optical fibers;
    a GRIN lens having a first end face proximate said first, second and third birefringent crystals and having a second end face;
    a mirror element; and
    a liquid crystal cell between said mirror element and said second end face of said GRIN lens, said liquid crystal cell having electrical terminals and in a first state or a second state responsive to preselected voltages applied to said electrical terminals, said end facets of said pair of optical fibers, said first, second and third birefringent crystals, said GRIN lens, said liquid crystal cell, and said mirror element arranged and oriented with respect to each other so that light from a first optical fiber of said pair passes through, and back from, said first, second and third birefringent crystals, said GRIN lens, said liquid crystal cell and said mirror element into a second optical fiber of said pair when said liquid crystal cell is in a first state, and light from said first optical fiber passes through, and back from, said first, second and third birefringent crystals, said GRIN lens, said liquid crystal cell and said mirror element, but not into said second optical fiber when said liquid crystal cell is in a second state.

2. The fiberoptic reflective variable attenuator and on-off switch of claim 1 further comprising
    a second pair of optical fibers in said longitudinal channel, each of said second pair of optical fibers having an end facet;
    said first birefringent crystal over an end facet of one optical fiber of said second pair;
    second and third birefringent crystals over an end facet of the other optical fiber of said second pair;
    and wherein said end facets of said second pair of optical fibers, said first, second and third birefringent crystals, said GRIN lens, said liquid crystal cell, and said reflecting element are arranged and oriented with respect to each other so that light from a first optical fiber of said second pair passes through, and back from, said first, second and third birefringent crystals, said GRIN lens, said liquid crystal cell and said mirror element into a second optical fiber of said second pair when said liquid crystal cell is in said first state, but light from said first optical fiber of said second pair passes through, and back from, said first, second and third birefringent crystals, said GRIN lens, said liquid crystal cell and said mirror element, but not into said second optical fiber of said second pair when said liquid crystal cell is in said second state.

3. The fiberoptic reflective variable attenuator and on-off switch of claim 2 wherein said end facets of said first and second pairs of said optical fibers are linearly arranged in a cross-sectional end view of said channel.

4. The fiberoptic reflective variable attenuator and on-off switch of claim 2 wherein said end facets of said first and second pairs of said optical fibers are arranged in a rectangle in a cross-sectional end view of said channel.

5. The fiberoptic reflective variable attenuator and on-off switch of claim 1 further comprising
    n pairs of optical fibers in said longitudinal channel, n being greater than two, each optical fiber of said n pairs having an end facet,
    said first birefringent crystal over an end facet of one optical fiber of each one of said n pairs;
    second and third birefringent crystals over an end facet of the other optical fiber of each one of said n pair;
    wherein said end facets of said n pairs of optical fibers, said first, second and third birefringent crystals, said GRIN lens, said liquid crystal cell, and said mirror element arranged and oriented with respect to each other so that light from a first optical fiber of one of said n pairs passes through, and back from, said first, second and third birefringent crystals, said GRIN lens, said liquid crystal cell and said mirror element into a second optical fiber of said one pair when said liquid crystal cell is in said first state, but light from said first optical fiber of said one pair passes through, and back from, said first, second and third birefringent crystals, said GRIN lens, said liquid crystal cell and said mirror element, but not into said second optical fiber of said pair when said liquid crystal cell is in said second state.

6. The fiberoptic reflective variable attenuator and on-off switch of claim 5 wherein said end facets of n pairs of said optical fibers are arranged in a rectangle in a cross-sectional end view of said channel.

7. The fiberoptic reflective variable attenuator and on-off switch of claim 1 wherein at least one of said first, second and third birefringent crystals comprise $YVO_4$.

8. The fiberoptic reflective variable attenuator and on-off switch of claim 7 wherein said first, second and third birefringent crystals comprise $YVO_4$.

9. The fiberoptic reflective variable attenuator and on-off switch of claim 1 wherein at least one of said first, second and third birefringent crystals comprise calcite.

10. The fiberoptic reflective variable attenuator and on-off switch of claim 9 wherein said first, second and third birefringent crystals comprise calcite.

11. The fiberoptic reflective variable attenuator and on-off switch of claim 1 wherein at least one of said first, second and third birefringent crystals comprise rutile.

12. The fiberoptic reflective variable attenuator and on-off switch of claim 11 wherein said first, second and third birefringent crystals comprise rutile.

13. The fiberoptic reflective variable attenuator and on-off switch of claim 1 wherein at least one of said first, second and third birefringent crystals comprise lithium niobate.

14. The fiberoptic reflective variable attenuator and on-off switch of claim 13 wherein said first, second and third birefringent crystals comprise lithium niobate.

15. The fiberoptic reflective variable attenuator and on-off switch of claim 1 wherein said end facets of said pair of optical fiber, said first, second and third birefringent crystals, said GRIN lens, said liquid crystal cell and said mirror element are arranged and oriented with respect to each other so that light from said first optical fiber of said pair passes through, and back from, said first, second and third birefringent crystals, said GRIN lens, said liquid crystal cell and said mirror element into said second optical fiber of said pair proportionally, corresponding to voltages intermediate said preselected voltages.

16. A fiberoptic reflective variable attenuator and on-off switch comprising
a joined optical fiber subassembly having
a first section having first and second independent optical fibers, each optical fiber having a core and cladding, said cladding enclosing said core of said optical fiber;
a second section adjoining said first section, said second section having said optical fibers joined, a single cladding enclosing said cores of said optical fibers, a diameter of said single cladding decreasing in a taper away from said first section, a diameter of each core of said optical fibers increasing in a taper away from said first section; and
a third section adjoining said second section, said third section having said single cladding enclosing said cores of said optical fibers, said diameter of said single cladding a constant diameter and said cores of said optical fibers having constant diameters;
a sleeve having a central longitudinal channel and an end face, said channel holding said third section of joined optical fiber subassembly, said cores of said first and second optical fibers having end facets;
a first birefringent crystal proximate said sleeve end face over an end facet of said first optical fiber core;
a second and third birefringent crystals proximate said sleeve end face over an end facet of said second optical fiber core;
a collimating GRIN lens having first and second end faces, said first end face proximate said sleeve end face and said birefringent crystal;
a liquid crystal cell proximate said second face of said GRIN lens, said liquid crystal cell having electrical terminals and in a first state or a second state responsive to preselected voltages applied to said electrical terminals; and
a mirror element proximate liquid crystal cell, said end facets of said first and second optical fiber cores, said first, second and third birefringent crystals, said GRIN lens, said liquid crystal cell and said mirror element arranged and oriented with respect to each other so that light from said end facet of said first optical fiber core passes through, and back from, said first, second and third birefringent crystals, said GRIN lens, said liquid crystal cell and said mirror element into said end facet of said second optical fiber core when said liquid crystal cell is in said first state, and light from said end facet of said first optical fiber core passes through, and back from, said first, second and third birefringent crystals, said GRIN lens, said liquid crystal cell and said mirror element, but not into said end facet of said second optical fiber core when said liquid crystal cell is in said second state.

17. A fiberoptic reflective variable attenuator and on-off switch comprising
a sleeve having a central longitudinal channel and an end face;
first and second optical fiber cores fixed in said channel, each of said cores defined by cladding material around said core;
a first birefringent crystal proximate said sleeve end face over said first optical fiber core;
second and third birefringent crystals proximate said sleeve end face over said second optical fiber core;
a collimating GRIN lens having first and second end faces, said first end face proximate said sleeve end face and said first, second and third birefringent crystals;
a liquid crystal cell proximate said second face of said GRIN lens, said liquid crystal cell having electrical terminals and in a first state or a second state responsive to preselected voltages applied to said electrical terminals; and
a mirror element proximate liquid crystal cell, said end facets, said first, second and third birefringent crystals, said GRIN lens, said liquid crystal cell and said mirror element arranged and oriented with respect to each other so that light from said first optical fiber core passes through, and back from, said first, second and third birefringent crystals, said GRIN lens, said liquid crystal cell and said mirror element into said optical fiber second core when said liquid crystal cell is in said first state, and light from said first optical fiber core passes through, and back from, said first, second and third birefringent crystals, said GRIN lens, said liquid crystal cell and said mirror element, but not into said second optical fiber core when said liquid crystal cell is in said second state.

18. The fiberoptic reflective variable attenuator and on-off switch of claim 17 further comprising
third and fourth optical fiber cores fixed in said central longitudinal sleeve channel, each of said cores defined by cladding material around said core and having an end facet, said end facets of said third and fourth optical fiber cores, said first, second and third birefringent crystals, said GRIN lens, said liquid crystal cell and said mirror element arranged and oriented with respect to each other so that light from said third optical fiber core passes through, and back from, said first, second and third birefringent crystals, said GRIN lens, said liquid crystal cell and said mirror element into said fourth optical fiber core when said liquid crystal cell is in said first state, and light from said third optical fiber core passes through, and back from, said first, second and third birefringent crystals, said GRIN lens, said liquid crystal cell and said mirror element, but not into said fourth optical fiber core when said liquid crystal cell is in said second state.

19. The fiberoptic reflective variable attenuator and on-off switch of claim 18 wherein cladding material around each of said optical fiber cores is separate from cladding material around said other optical fiber cores so that separate optical fibers are defined in said central longitudinal channel.

20. The fiberoptic reflective variable attenuator and on-off switch of claim 18 wherein cladding material around said first optical fiber core continues around said third optical fiber core and cladding material around said second optical fiber core continues around said fourth optical fiber core so that four separate optical fibers are not defined in said central longitudinal channel.

21. The fiberoptic reflective variable attenuator and on-off switch of claim 20 wherein said first and third optical fiber cores form part of a first joined optical fiber subassembly, and said second and fourth optical fiber cores form part of a second joined optical fiber subassembly, each joined optical fiber subassembly comprising a first section having first and second independent optical fibers, each optical fiber having a core and cladding, said cladding enclosing said core of said optical fiber;

a second section adjoining said first section, said second section having said optical fibers joined, a single cladding enclosing said cores of said optical fibers, a diameter of said single cladding decreasing in a taper away from said first section, a diameter of each core of said optical fibers increasing in a taper away from said first section; and a third section adjoining said second section, said third section having said single cladding enclosing said cores of said optical fibers, said diameter of said single cladding a constant diameter and said cores of said optical fibers having constant diameters, said third section fixed in said central longitudinal channel.

* * * * *